United States Patent
Xu et al.

(10) Patent No.: US 10,003,818 B2
(45) Date of Patent: Jun. 19, 2018

(54) VIDEO CODING SYSTEM WITH INTRA PREDICTION MECHANISM AND METHOD OF OPERATION THEREOF

(71) Applicant: Sony Corporation, Tokyo (JP)

(72) Inventors: Jun Xu, Cupertino, CA (US); Ali Tabatabai, Cupertino, CA (US); Ohji Nakagami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 837 days.

(21) Appl. No.: 14/339,309

(22) Filed: Jul. 23, 2014

(65) Prior Publication Data

US 2015/0103914 A1    Apr. 16, 2015

Related U.S. Application Data

(60) Provisional application No. 61/889,881, filed on Oct. 11, 2013.

(51) Int. Cl.
| | | |
|---|---|---|
| *H04N 19/593* | (2014.01) | |
| *H04N 19/105* | (2014.01) | |
| *H04N 19/139* | (2014.01) | |
| *H04N 19/176* | (2014.01) | |
| *H04N 19/70* | (2014.01) | |
| *H04N 19/513* | (2014.01) | |

(52) U.S. Cl.
CPC ......... *H04N 19/593* (2014.11); *H04N 19/105* (2014.11); *H04N 19/139* (2014.11); *H04N 19/176* (2014.11); *H04N 19/521* (2014.11); *H04N 19/70* (2014.11)

(58) Field of Classification Search
CPC .................................................. H04N 19/593
See application file for complete search history.

(56) References Cited

U.S. PATENT DOCUMENTS

| | | |
|---|---|---|
| 8,494,042 B2 | 7/2013 | Park et al. |
| 2011/0261882 A1 | 10/2011 | Zheng et al. |
| 2012/0287995 A1 | 11/2012 | Budagavi |
| 2013/0114697 A1 | 5/2013 | Siddaramanna et al. |
| 2013/0177082 A1 | 7/2013 | Sugio et al. |
| 2013/0301719 A1 | 11/2013 | Sasai et al. |
| 2013/0336394 A1 | 12/2013 | Tu et al. |

(Continued)

OTHER PUBLICATIONS

U.S. Appl. No. 14/339,324, filed Jul. 23, 2014, Xu et al.

(Continued)

*Primary Examiner* — James Pontius
(74) *Attorney, Agent, or Firm* — Chip Law Group (57) ABSTRACT

A video coding system, and a method of operation thereof, includes: a source input module for receiving a frame from a video source; and a picture process module, coupled to the source input module, for generating a neighboring coding unit in the frame, for generating an intra block motion vector with a constrained intra prediction flag enabled and the neighboring coding unit generated based on only an intra-picture prediction mode, for generating a current coding unit based on the intra block motion vector, the current coding unit adjacent the neighboring coding unit, and for generating a video bitstream based on the current coding unit for a video decoder to receive and decode for displaying on a device.

17 Claims, 7 Drawing Sheets

(56) References Cited

U.S. PATENT DOCUMENTS

2014/0044171 A1    2/2014  Takehara et al.
2014/0334542 A1*  11/2014  Lee ..................... H04N 19/593
                                                                     375/240.12

OTHER PUBLICATIONS

Flynn et al. JCTVC-N1005 v3 High Efficiency Video Coding (HEVC) Range Extensions Text specification Draft 4, JCTVC-N1005_v3, Aug. 8, 2013, pp. 322 page, vol. 3, Joint Collaborative Team on Video Coding (JCT-VC) of ITU-T SG WP 3 and ISO/IEC JTC 1/SC 29/WG 11, Incheon, KR.

Saxena et al., JCTVC-N1123_v3—HEVC Range Extensions Core Experiment 3 (RCE3): Intra Prediction techniques, JCTVC-N1123_v3, Aug. 28, 2013, pp. 1-6, vol. 3, Joint Collaborative Team on Video Coding (JCT-VC) of ITU-T SG 16 WP 3 and ISO/IEC JTC 1/SC 29/WG 11. Vienna. Austria.

Xu et al., On intra block copying in RExt, JCTVC-Oxxxx, Input Document to JCT-VC, Oct. 2013, pp. 1-8, Joint Collaborative Team on Video Coding (JCT-VC) of ITU-T SG WP 3 and ISO/IEC JTC 1/SC 29/WG 11 15th Meeting, Geneva, CH.

* cited by examiner

VIDEO CODING SYSTEM WITH INTRA PREDICTION MECHANISM AND METHOD OF OPERATION THEREOF

CROSS-REFERENCE TO RELATED APPLICATION(S)

This application claims the benefit of U.S. Provisional Patent Application Ser. No. 61/889,881 filed Oct. 11, 2013, and the subject matter thereof is incorporated herein by reference thereto.

The present application contains subject matter related to a concurrently filed U.S. Patent Application by Jun Xu, Ali Tabatabai, and Ohji Nakagami entitled "VIDEO CODING SYSTEM WITH SEARCH RANGE AND METHOD OF OPERATION THEREOF". The related application is assigned to Sony Corporation and is identified by U.S. patent application Ser. No. 14/339,324. The subject matter thereof is incorporated herein by reference thereto.

TECHNICAL FIELD

The present invention relates generally to a video processing system and more particularly to a system for video coding with intra prediction.

BACKGROUND ART

The deployment of high quality video to smart phones, high definition televisions, automotive information systems, and other video devices with screens has grown tremendously in recent years. The wide variety of information devices supporting video content requires multiple types of video content to be provided to devices with different size, quality, and connectivity capabilities.

Video has evolved from two dimensional single view video to multi-view video with high-resolution three-dimensional imagery. In order to make the transfer of video more efficient, different video coding and compression schemes have tried to get the best picture from the least amount of data.

The Moving Pictures Experts Group (MPEG) developed standards to allow good video quality based on a standardized data sequence and algorithm. The MPEG4 Part 10 (H.264)/Advanced Video Coding design was an improvement in coding efficiency typically by a factor of two over the prior MPEG-2 format.

The quality of the video is dependent upon the manipulation and compression of the data in the video. The video can be modified to accommodate the varying bandwidths used to send the video to the display devices with different resolutions and feature sets. However, distributing larger, higher quality video or more complex video functionality requires additional bandwidth and improved video compression.

Thus, a need still remains for a video coding system that can deliver good picture quality and features across a wide range of device with different sizes, resolutions, and connectivity. In view of the increasing demand for providing video on the growing spectrum of intelligent devices, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a video coding system including: receiving a frame from a video source; generating a neighboring coding unit in the frame; generating an intra block motion vector with a constrained intra prediction flag enabled and the neighboring coding unit generated based on only an intra-picture prediction mode; generating a current coding unit based on the intra block motion vector, the current coding unit adjacent the neighboring coding unit; and generating a video bitstream based on the current coding unit for a video decoder to receive and decode for displaying on a device.

The present invention provides a video coding system, including: a source input module for receiving a frame from a video source; and a picture process module, coupled to the source input module, for generating a neighboring coding unit in the frame, for generating an intra block motion vector with a constrained intra prediction flag enabled and the neighboring coding unit generated based on only an intra-picture prediction mode, for generating a current coding unit based on the intra block motion vector, the current coding unit adjacent the neighboring coding unit, and for generating a video bitstream based on the current coding unit for a video decoder to receive and decode for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a microelectromechanical system (MEMS), passive devices, environmental sensors including temperature sensors, or a combination thereof The term "syntax" referred to herein means a set of elements describing a data structure. The term "block" referred to herein means a group of picture elements, pixels, or smallest addressable elements in a display device.

Figure 1:
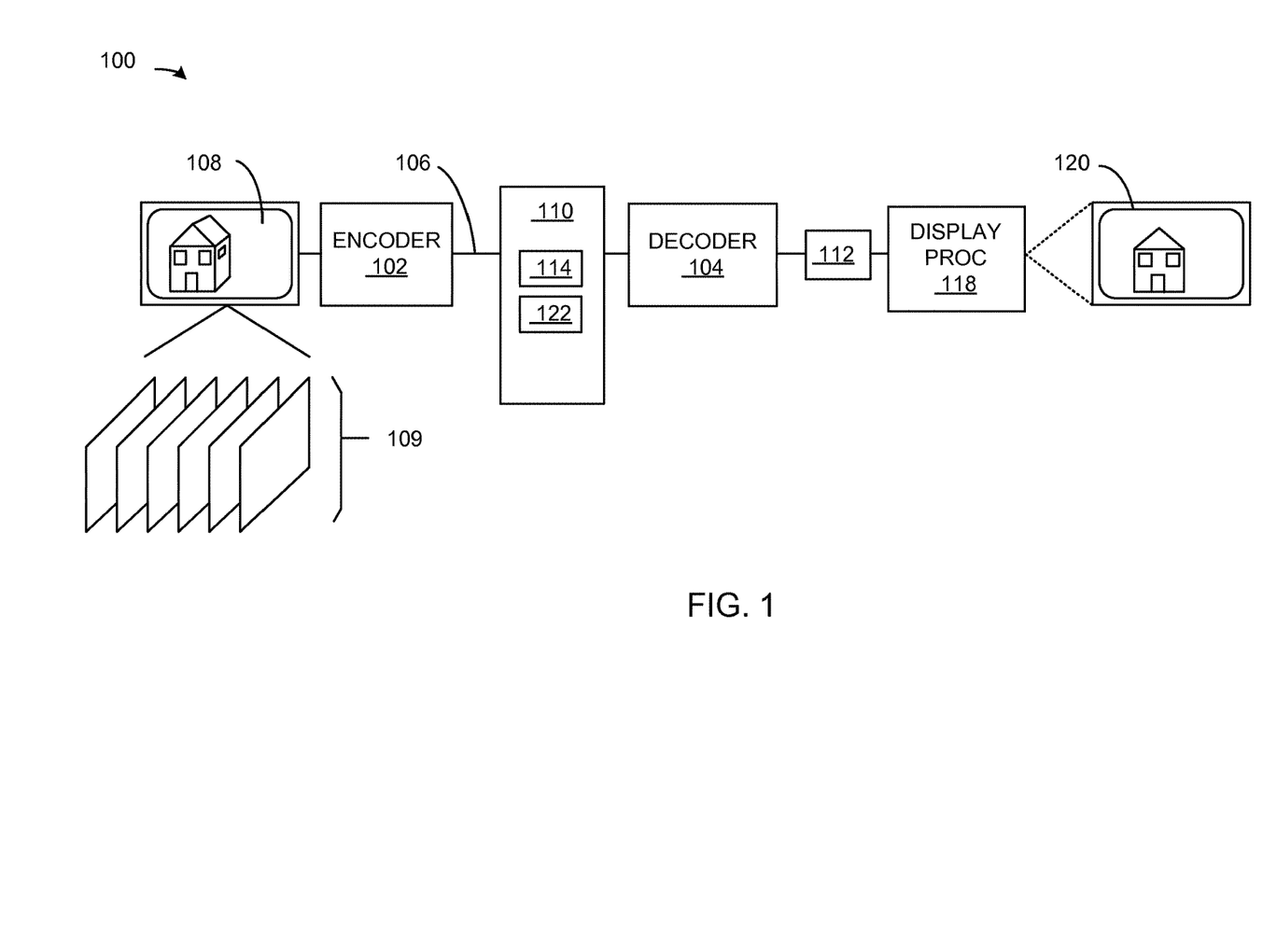
FIG. 1 is a block diagram of a video coding system in an embodiment of the present invention.

Referring now to FIG. 1, therein is shown a block diagram of a video coding system 100 in an embodiment of the present invention. The video coding system 100 can encode and decode video information. A video encoder 102 can receive a video source 108 and send a video bitstream 110 to a video decoder 104 for decoding and display on a display interface 120.

The video encoder 102 can receive and encode the video source 108. The video encoder 102 is a unit for encoding the video source 108 into a different form. The video source 108 is defined as a digital representation of a scene of objects.

Encoding is defined as computationally modifying the video source 108 to a different form. For example, encoding can compress the video source 108 into the video bitstream 110 to reduce the amount of data needed to transmit the video bitstream 110.

In another example, the video source 108 can be encoded by being compressed, visually enhanced, separated into one or more views, changed in resolution, changed in aspect ratio, or a combination thereof. In another illustrative example, the video source 108 can be encoded according to the High-Efficiency Video Coding (HEVC)/H.265 standard. In yet another illustrative example, the video source 108 can be further encoded to increase spatial scalability.

The video source 108 can include frames 109. The frames 109 are individual images that form the video source 108. For example, the video source 108 can be the digital output of one or more digital video cameras taking 24 of the frames 109 per second.

The video encoder 102 can encode the video source 108 to form the video bitstream 110. The video bitstream 110 is defined a sequence of bits representing information associated with the video source 108. For example, the video bitstream 110 can be a bit sequence representing a compression of the video source 108.

In an illustrative example, the video bitstream 110 can be a serial bitstream sent from the video encoder 102 to the video decoder 104. In another illustrative example, the video bitstream 110 can be a data file stored on a storage device and retrieved for use by the video decoder 104.

The video encoder 102 can receive the video source 108 for a scene in a variety of ways. For example, the video source 108 representing objects in the real-world can be captured with a video camera, multiple cameras, generated with a computer, provided as a file, or a combination thereof.

The video source 108 can include a variety of video features. For example, the video source 108 can include single view video, multiview video, stereoscopic video, or a combination thereof.

The video encoder 102 can encode the video source 108 using a video syntax 114 to generate the video bitstream 110. The video syntax 114 is defined as a set of information elements that describe a coding system for encoding and decoding the video source 108. The video bitstream 110 is compliant with the video syntax 114, such as High-Efficiency Video Coding/H.265, and can include a HEVC video bitstream, an Ultra High Definition video bitstream, or a combination thereof. The video bitstream 110 can include the video syntax 114.

The video bitstream 110 can include information representing the imagery of the video source 108 and the associated control information related to the encoding of the video source 108. For example, the video bitstream 110 can include an occurrence of the video syntax 114 having a representation of the video source 108.

The video encoder 102 can encode the video source 108 to form a video layer 122. The video layer 122 is a representation of the video source 108. For example, the video layer 122 can include the video source 108 at a different resolution, quality, bit rate, frame rate, or a combination thereof. The video layer 122 can be a lower resolution representation of the video source 108. In another example, the video layer 122 can be a high efficiency video coding (HEVC) representation of the video source 108. In yet another example, the video layer 122 can be a representation of the video source 108 configured for a smart phone display.

The video coding system 100 can include the video decoder 104 for decoding the video bitstream 110. The video decoder 104 is defined as a unit for receiving the video bitstream 110 and modifying the video bitstream 110 to form a video stream 112.

The video decoder 104 can decode the video bitstream 110 to form the video stream 112 using the video syntax 114. Decoding is defined as computationally modifying the video bitstream 110 to form the video stream 112. For example, decoding can decompress the video bitstream 110 to form the video stream 112 formatted for displaying on the display the display interface 120.

The video stream 112 is defined as a computationally modified version of the video source 108. For example, the video stream 112 can include a modified occurrence of the video source 108 with different resolution. The video stream 112 can include cropped decoded pictures from the video source 108.

The video decoder 104 can form the video stream 112 in a variety of ways. For example, the video decoder 104 can form the video stream 112 from the video layer 122. In another example, the video decoder 104 can form the video stream 112 from the video layer 122.

In a further example, the video stream 112 can have a different aspect ratio, a different frame rate, different stereoscopic views, different view order, or a combination thereof than the video source 108. The video stream 112 can have different visual properties including different color parameters, color planes, contrast, hue, or a combination thereof The video coding system 100 can include a display processor 118. The display processor 118 can receive the video stream 112 from the video decoder 104 for display on the display interface 120. The display interface 120 is a unit that can present a visual representation of the video stream 112.

For example, the display interface 120 can include a smart phone display, a digital projector, a DVD player display, or a combination thereof. Although the video coding system 100 shows the video decoder 104, the display processor 118, and the display interface 120 as individual units, it is understood that the video decoder 104 can include the display processor 118 and the display interface 120.

The video encoder 102 can send the video bitstream 110 to the video decoder 104 in a variety of ways. For example, the video encoder 102 can send the video bitstream 110 to the video decoder 104 over a communication path 106. In another example, the video encoder 102 can send the video bitstream 110 as a data file on a storage device. The video decoder 104 can access the data file to receive the video bitstream 110.

The communication path 106 can be a variety of networks suitable for data transfer. For example, the communication path 106 can include wireless communication, wired communication, optical, infrared, or the combination thereof. Satellite communication, cellular communication, terrestrial communication, Bluetooth, Infrared Data Association standard (IrDA), wireless fidelity (WiFi), and worldwide interoperability for microwave access (WiMAX) are examples of wireless communication that can be included in the communication path 106. Ethernet, digital subscriber line (DSL), fiber to the home (FTTH), digital television, and plain old telephone service (POTS) are examples of wired communication that can be included in the communication path 106.

The video coding system 100 can employ a variety of video coding syntax structures. For example, the video coding system 100 can encode and decode video information using High Efficiency Video Coding/H.265 (HEVC), scalable extensions for HEVC (SHVC), or other video coding syntax structures.

The video encoder 102 and the video decoder 104 can be implemented in a variety of ways. For example, the video encoder 102 and the video decoder 104 can be implemented using hardware, software, or a combination thereof. For example, the video encoder 102 can be implemented with custom circuitry, a digital signal processor, microprocessor, or a combination thereof. In another example, the video decoder 104 can be implemented with custom circuitry, a digital signal processor, microprocessor, or a combination thereof.

Figure 2:
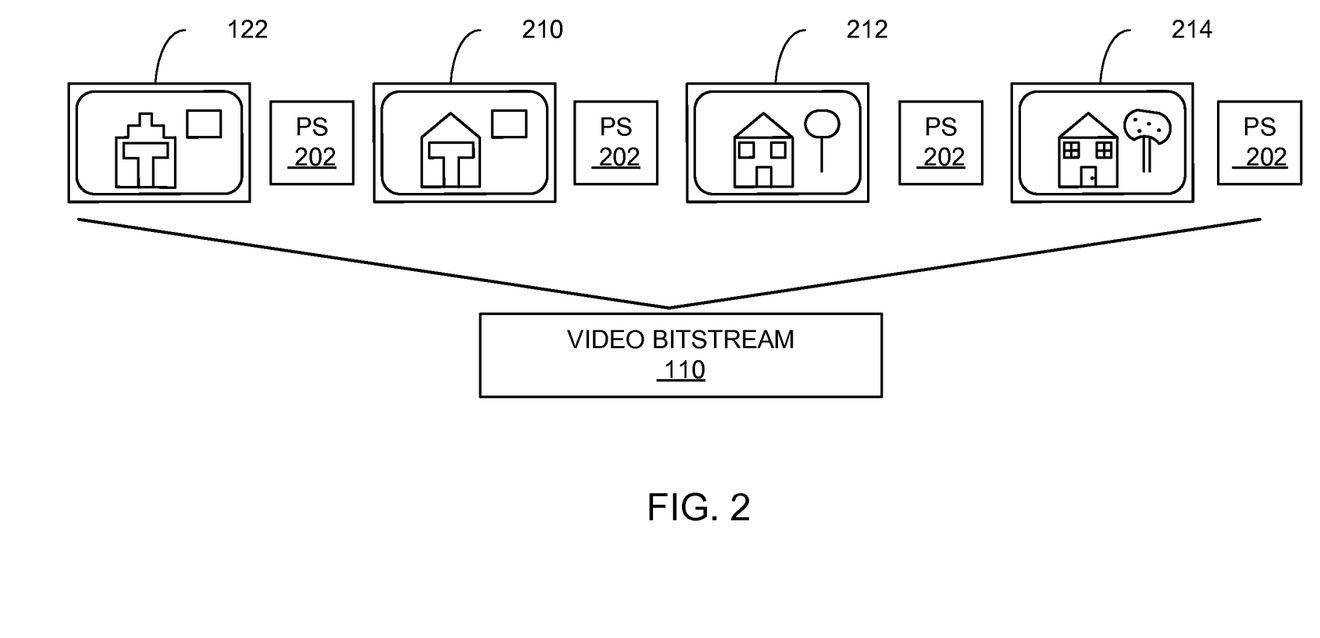
FIG. 2 is an example of the video bitstream.

Referring now to FIG. 2, therein is shown an example of the video bitstream 110. The video bitstream 110 includes an encoded occurrence of the video source 108 of FIG. 1 and can be decoded to form the video stream 112 of FIG. 1 for display on the display interface 120 of FIG. 1. The video bitstream 110 can include the video layer 122 based on the video source 108.

The video bitstream 110 can include one of the frames 109 of FIG. 1 of the video layer 122 followed by a parameter set 202 associated with the video source 108.

Figure 3:
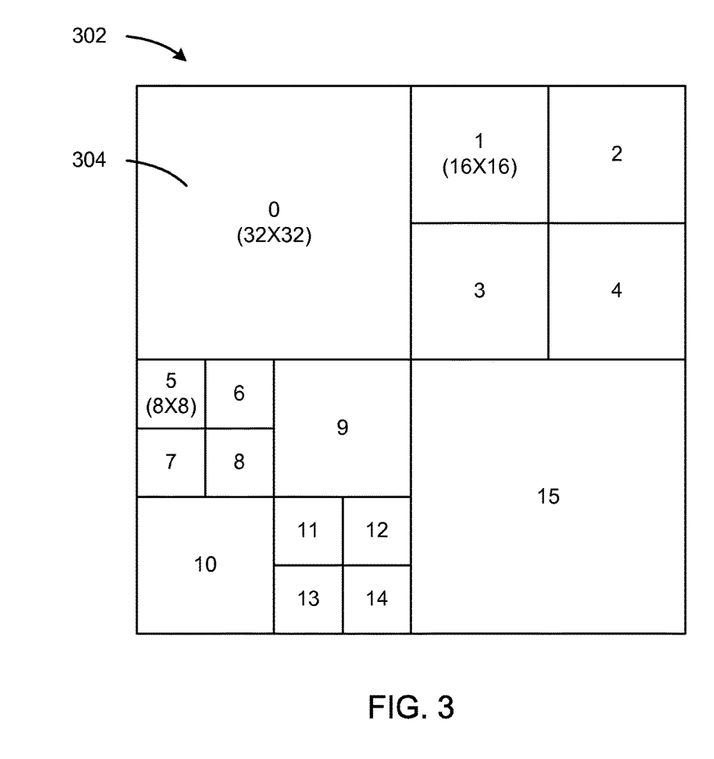
FIG. 3 is an example of a coding tree unit.

Referring now to FIG. 3, therein is shown an example of a coding tree unit 302. The coding tree unit 302 is a basic unit of video coding.

The video source 108 of FIG. 1 can include the frames 109 of FIG. 1. Each of the frames 109 can be encoded into the coding tree unit 302.

The coding tree unit 302 can be subdivided into coding units 304 using a quadtree structure. The quadtree structure is a tree data structure in which each internal mode has exactly four children. The quadtree structure can partition a two dimensional space by recursively subdividing the space into four quadrants.

The frames 109 of the video source 108 can be subdivided into the coding units 304. The coding units 304 are square regions that make up one of the frames 109 of the video source 108.

The coding units 304 can be a variety of sizes. For example, the coding units 304 can be up to 64×64 pixels in size. Each of the coding units 304 can be recursively subdivided into four more of the coding units 304. In another example, the coding units 304 can include the coding units 304 having 64×64 pixels, 32×32 pixels, 16×16 pixels, or 8×8 pixels.

Figure 4:
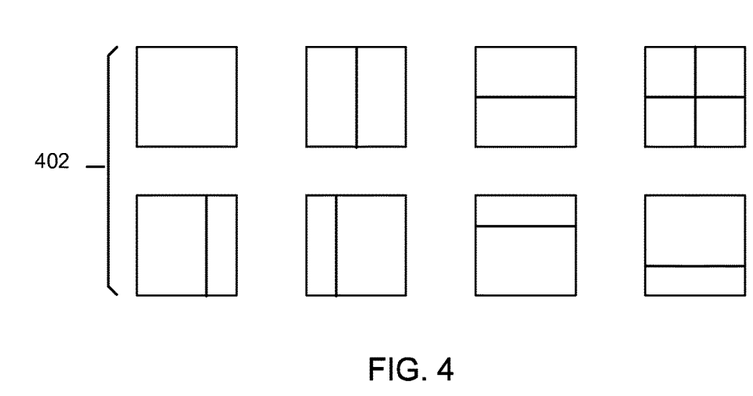
FIG. 4 is an example of prediction units.

Referring now to FIG. 4, therein is shown an example of prediction units 402. The prediction units 402 are regions within the coding units 304 of FIG. 3. The contents of the prediction units 402 can be calculated based on the content of other adjacent regions of pixels.

Each of the prediction units 402 can be calculated in a variety of ways. For example, the prediction units 402 can be calculated using intra-prediction or inter-prediction.

The prediction units 402 calculated using intra-prediction can include content based on neighboring regions. For example, the content of the prediction units 402 can be calculated using an average value, by fitting a plan surface to one of the prediction units 402, direction prediction extrapolated from neighboring regions, or a combination thereof The prediction units 402 calculated using inter-prediction can include content based on image data from the frames 109 of FIG. 1 that are nearby. For example, the content of the prediction units 402 can include content calculated using previous frames or later frames, content based on motion compensated predictions, average values from multiple frames, or a combination thereof.

The prediction units 402 can be formed by partitioning one of the coding units 304 in one of eight partition modes. The coding units 304 can include one, two, or four of the prediction units 402. The prediction units 402 can be rectangular or square.

For example, the prediction units 402 can be represented by mnemonics 2N×2N, 2N×N, N×2N, N×N, 2N×nU, 2N×nD, nL×2N, and nR×2N. Uppercase "N" can represent half the length of one of the coding units 304. Lowercase "n" can represent one quarter of the length of one of the coding units 304. Uppercases "R" and "L" can represent right or left respectively. Uppercase "U" and "D" can represent up and down respectively.

Figure 5:
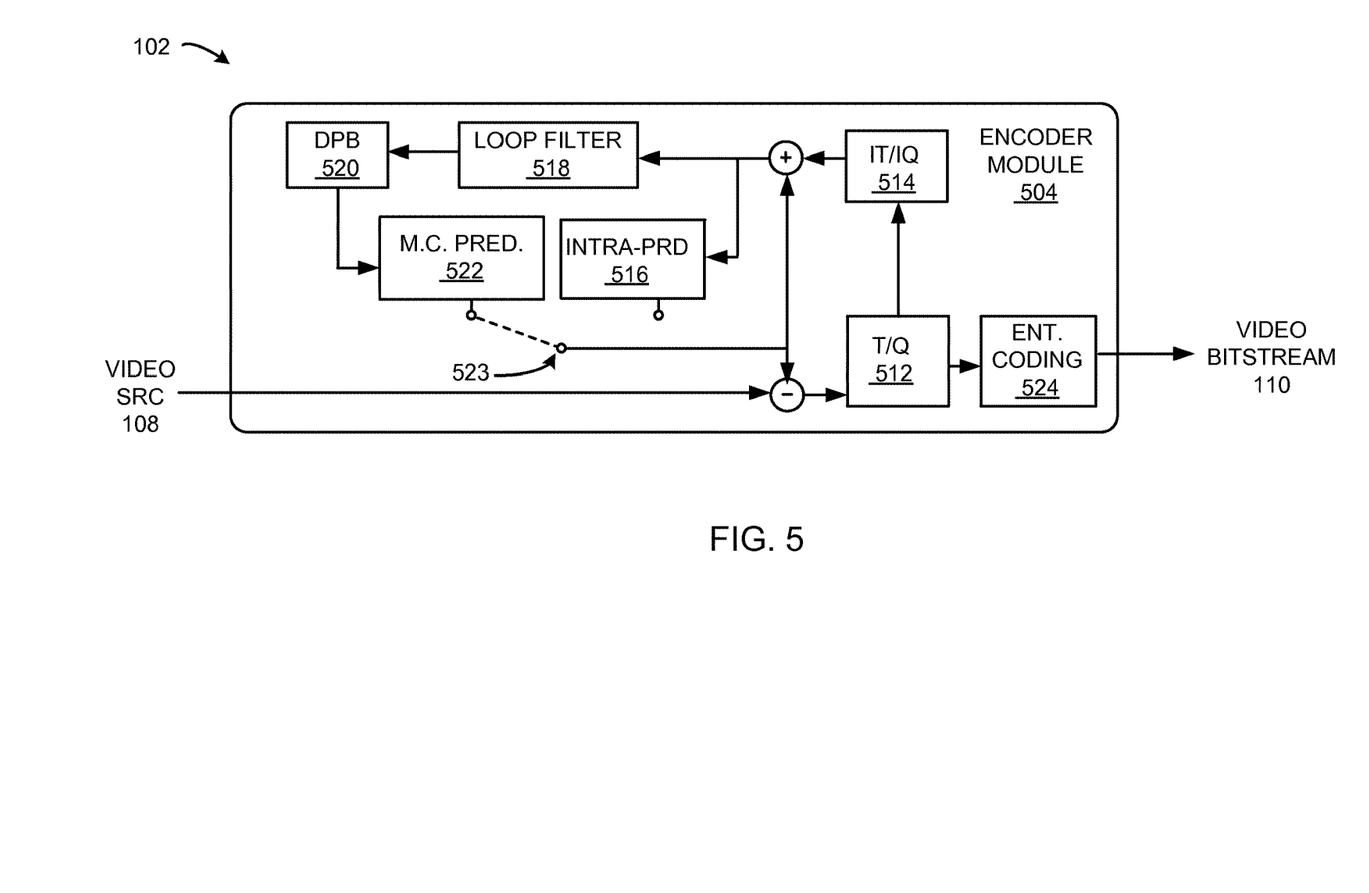
FIG. 5 is an exemplary block diagram of the video encoder.

Referring now to FIG. 5, therein is shown an exemplary block diagram of the video encoder 102. The video encoder 102 can form the video layer 122 of FIG. 1 based on the video source 108.

The video encoder 102 can receive the video source 108. The video encoder 102 can encode the video source 108 to form the video bitstream 110.

The video coding system 100 of FIG. 1 can include the video decoder 104 of FIG. 1 for decoding the video bitstream 110 provided by the video encoder 102. The video decoder 104 can have a complementary structure to the video encoder 102 for forming the video stream 112 of FIG. 1 based on the video layer 122. It is understood that the video decoder 104 can include similar modules to the video encoder 102.

The video encoder 102 can include an encoder module 504. The encoder module 504 can be implemented in a variety of ways. For example, the encoder module 504 can be a HEVC/Advanced Video coding (AVC) encoder.

The encoder module 504 can receive the video source 108 and form the video layer 122. The video source 108 can be at the original resolution or can be downsampled to reduce the resolution or quality.

The encoder module 504 can include a transformation and quantization module 512 for performing transformation operations, scaling operations, quantization operations, or a combination thereof. The transformation and quantization module 512 can receive the video source 108 and intermediate video content and pass additional intermediate video content to an entropy coding module 524 for forming the video bitstream 110.

The intermediate video content is partially processed video information used by the encoder module 504. The intermediate video content can include portions of frames, motion elements, regions, color maps, tables, or a combination thereof.

The encoder module 504 can include an inverse transformation and inverse quantization module 514. The inverse transformation and inverse quantization module 514 can perform inverse transformation and inverse quantization operations on the intermediate video content received from the transformation and quantization module 512.

The encoder module 504 can include an intra-picture prediction module 516. The intra-picture prediction module 516 can calculate portions of the intermediate video content based on adjacent regions within one of the frames 109 of FIG. 1. The intra-picture prediction module 516 can receive intermediate video content from the inverse transformation and inverse quantization module 514.

The encoder module 504 can include a loop filter module 518 for processing the intermediate video content based on loop levels with the encoder module 504. The loop filter module 518 can process and send the intermediate video content to a digital picture buffer module 520. The loop filter module 518 can process reconstructed samples or portions of the video layer 122 before writing into the digital picture buffer module 520. The loop filter module 518 can improve the reconstructed picture quality for better temporal prediction for future pictures.

The encoder module 504 can include the digital picture buffer module 520. The digital picture buffer module 520 can include memory storage for holding intermediate video content. The digital picture buffer module 520 can receive the intermediate video content from the loop filter module 518 and buffer the information for future loop iterations. The digital picture buffer module 520 can send the intermediate video content to a motion compensation prediction module 522.

The encoder module 504 can include the motion compensation prediction module 522. The motion compensation prediction module 522 calculate motion compensation and motion vector information based on multiple frames from the video source 108 and intermediate video content.

The encoder module 504 can selectively loop the output of the intra-picture prediction module 516 or the motion compensation prediction module 522 back to the transformation and quantization module 512 using a mode selector 523. The mode selector 523 can select the output of the intra-picture prediction module 516 or the motion compensation prediction module 522 for sending to the transformation and quantization module 512. The selection of which module to select is based on the content of the video source 108.

The encoder module 504 can include the entropy coding module 524. The entropy coding module 524 can encode the residual portions of the video source 108 to form a portion of the video layer 122. The entropy coding module 524 can output the video bitstream 110.

It has been found the encoding the video source 108 with the video encoder 102 to form the video layer 122 to form the video bitstream 110 increases the level of video compression and increases operation flexibility. Providing the video layer 122 in the video bitstream 110 allows the formation of the video stream 112 at different resolutions at a lower bandwidth by partitions the compressed video information.

It has been found that the video encoder 102 having the encoder module 504 can increase performance and flexibility. By encoding the video layer 122, the video coding system 100 can provide different resolutions and image sizes to support different video display systems.

Figure 6:
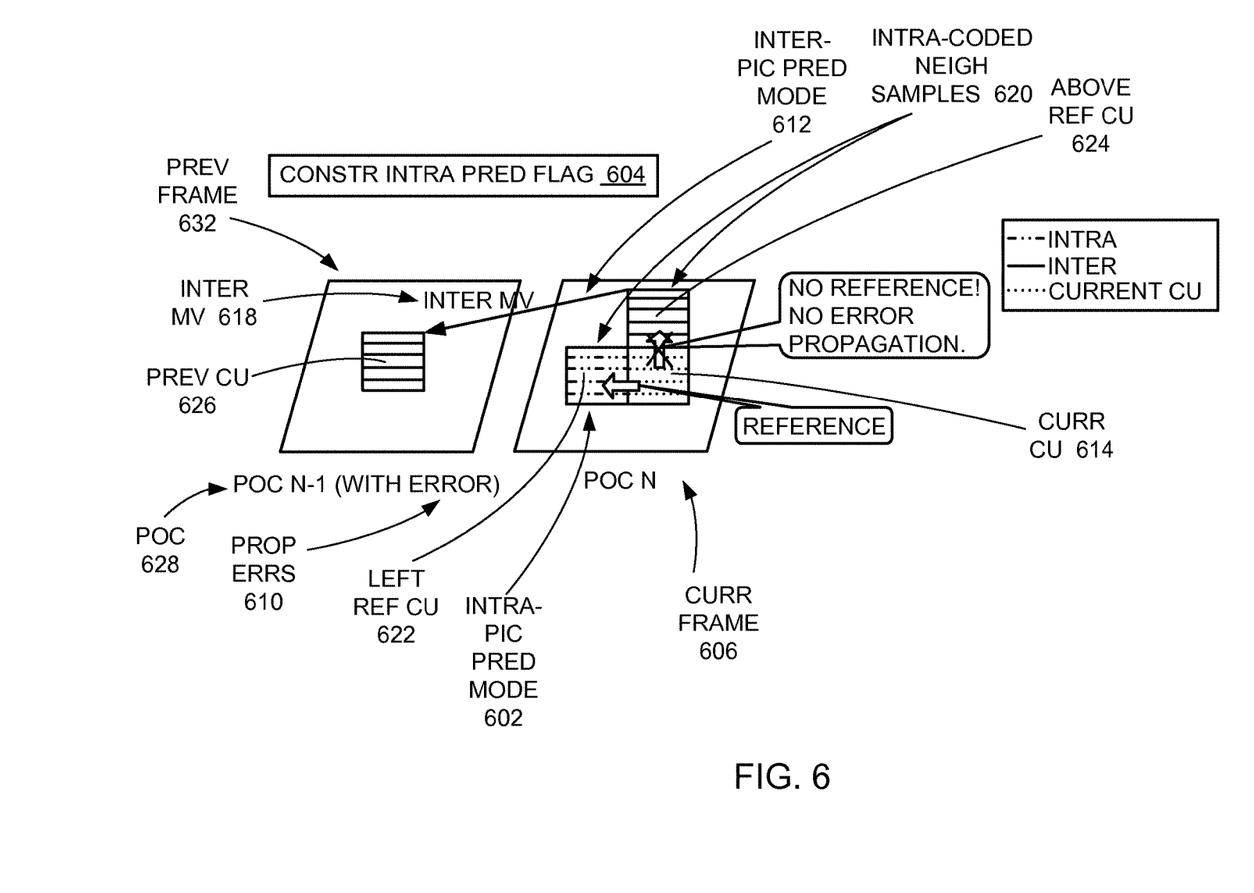
FIG. 6 is an example of an interaction of an intra-picture prediction mode and a constrained intra prediction flag of the video coding system of FIG. 1.

Referring now to FIG. 6, therein is shown an example of an interaction of an intra-picture prediction mode 602 and a constrained intra prediction flag 604 of the video coding system 100 of FIG. 1. The constrained intra prediction flag 604 can also interact with an intra block copying process that may be considered in extension works focusing on screen contents. The interaction can be determined or detected by the intra-picture prediction module 516 of FIG. 5.

The intra-picture prediction mode 602 is a spatial compression that uses only references from a current frame 606, which is one of the frames 109 of FIG. 1 currently being coded. The intra-picture prediction mode 602 employs a spatial coding method that uses data from neighboring prediction blocks previously encoded to generate prediction for original blocks. The term "neighboring" refers to coding blocks within one of the frames 109. The constrained intra prediction flag 604 is an identifier that is employed to control or determine how the intra-picture prediction mode 602 is to be specifically performed.

The scope of the embodiments of the present invention can be broadened such that it can cover the extension works. For example, the extension works can be based on, extended from, and not in a version of the High-Efficiency Video Coding (HEVC) including version 1.

The intra block copying process is a method that copies a preceding block region of a picture. The intra block copying process is employed for the intra-picture prediction mode 602.

FIG. 6 depicts propagation errors 610 that cause unreliable prediction or compensation of a motion vector of a current coding unit 614 due to errors in reference coding units or a chain effect of motion vectors of the reference coding units. For example, the propagation errors 610 can occur due to loss of temporal references or errors accumulated through any number of a motion vector using the intra-picture prediction mode 602, an inter motion vector 618, or a combination thereof.

The encoder module 504 of FIG. 5 can be implemented with an inter-picture prediction mode 612 is a temporal compression that uses one or more earlier or later frames in a sequence to compress a current frame. The constrained intra prediction flag 604 restricts intra reference samples to be only from intra-coded neighbour samples 620. The intra-coded neighbour samples 620 are neighboring pixels or samples within one of the frames 109, whereby the neighboring pixels or samples are reconstructed using the intra-picture prediction mode 602.

The current coding unit 614 is a group of picture elements, pixels, or smallest addressable elements in a display device that are processed using methods of reducing redundancy in video data. The current coding unit 614 can be one of the coding units 304 of FIG. 3 or the prediction units 402 of FIG. 4.

The inter motion vector 618 is information indicating a displacement between a location of a current block and that of a target block in a reference picture, which is a previously decoded picture. The inter motion vector 618, or so-called the target block, serves as prediction for the current block.

FIG. 6 depicts the current coding unit 614, a left reference coding unit 622, an above reference coding unit 624, and a previous coding unit 626. The left reference coding unit 622 is a group of picture elements, pixels, or smallest addressable elements in a display device that are processed using the intra-picture prediction mode 602. The left reference coding unit 622 provides reference samples for intra prediction and is generated based on only the intra-picture prediction mode 602 when the constrained intra prediction flag 604 is enabled. In other words, the left reference coding unit 622 is not generated based on the inter-picture prediction mode 612 and an intra block copying (IBC) mode. For example, the constrained intra prediction flag 604 is enabled when the constrained intra prediction flag 604 is set or assigned to a binary value of "1" or any state indicating that the constrained intra prediction flag 604 is enabled or active.

The above reference coding unit 624 is a group of picture elements, pixels, or smallest addressable elements in a display device that are processed using the inter-picture prediction mode 612. The left reference coding unit 622 and the above reference coding unit 624, such as a neighboring coding unit (CU) and another neighboring coding unit (CU), respectively, can be adjacent or immediately adjacent the current coding unit 614.

Double arrows or arrows with widths wider than other arrows are shown from the current coding unit 614 to the left reference coding unit 622 and the above reference coding unit 624 in FIG. 6. The double arrows indicate that the left reference coding unit 622 is a rightmost column sample of the current coding unit 614 and the above reference coding unit 624 is a bottom row sample of the current coding unit 614.

The current coding unit 614, the left reference coding unit 622, and the above reference coding unit 624 are shown in the current frame 606. The frames 109 can be designated with a picture order count 628 (POC), denoted by "N−1" and "N", where N is a counting number. For illustration purposes, the current frame 606 is denoted with the picture order count 628 of "N". The picture order count 628 is defined as a numerical value indicating which one of the frames 109 is being coded.

The previous coding unit 626 is shown in a previous frame 632, which is another of the frames 109 that has already been coded. The previous coding unit 626 is a group of picture elements, pixels, or smallest addressable elements in a display device that are processed using any compression methods. Although the previous coding unit 626 shown as a reference frame of the above reference coding unit 624 is coded using the inter-picture prediction mode 612, the previous coding unit 626 can be coded using any coding methods. For example, the previous coding unit 626 can be coded using the intra-picture prediction mode 602 or any other compression processes.

The previous frame 632 is another of the frames 109 that has already been coded before the current coding unit 614 is coded. For illustration purposes, the previous frame 632 is denoted with the picture order count 628 of "N−1", which is just one frame immediately preceding the current frame 606, although it is understood that the previous frame 632 can be any of the frames 109 that precede the current frame 606.

The above reference coding unit 624 in the current frame 606 can be predicted using the inter motion vector 618 that is associated with the previous coding unit 626 in the previous frame 632. There can be problems with the previous coding unit 626, the inter motion vector 618, or a combination thereof. For example, the problems can include errors due to loss of the temporal references. As a specific example, the loss of the temporal references can include loss of the previous coding unit 626 and the inter motion vector 618, and errors in determining the inter motion vector 618 for the above reference coding unit 624.

In video coding systems, pictures can be processed in a time wise or temporal order. Therefore, previous encoded pictures can serve as references for later pictures and thus introducing dependency. If the referenced pictures are lost, then the later pictures cannot be reconstructed.

In such cases, the loss of the referenced pictures can happen in communication channels due to signal interferences, and there might be data loss, which can affect the later pictures. Therefore, the above reference coding unit 624 is not employed as a reference for the current coding unit 614 to prevent the propagation errors 610 due to the data loss or any other effects that directly or indirectly impact prediction or construction of the current coding unit 614 when the constrained intra prediction flag 604 is set to true or active.

In the video coding system 100, the current coding unit 614 is coded using only the left reference coding unit 622 to prevent the propagation errors 610 when the constrained intra prediction flag 604 is set to true. For illustration purposes, the left reference coding unit 622 employed as a reference for the current coding unit 614 is indicated using an arrow that points from the current coding unit 614 to the left reference coding unit 622. Also for illustration purposes, the above reference coding unit 624 not employed as a reference for the current coding unit 614 is indicated using an "X" over an arrow that points from the current coding unit 614 to the above reference coding unit 624 when the constrained intra prediction flag 604 is set to true.

Figure 7:
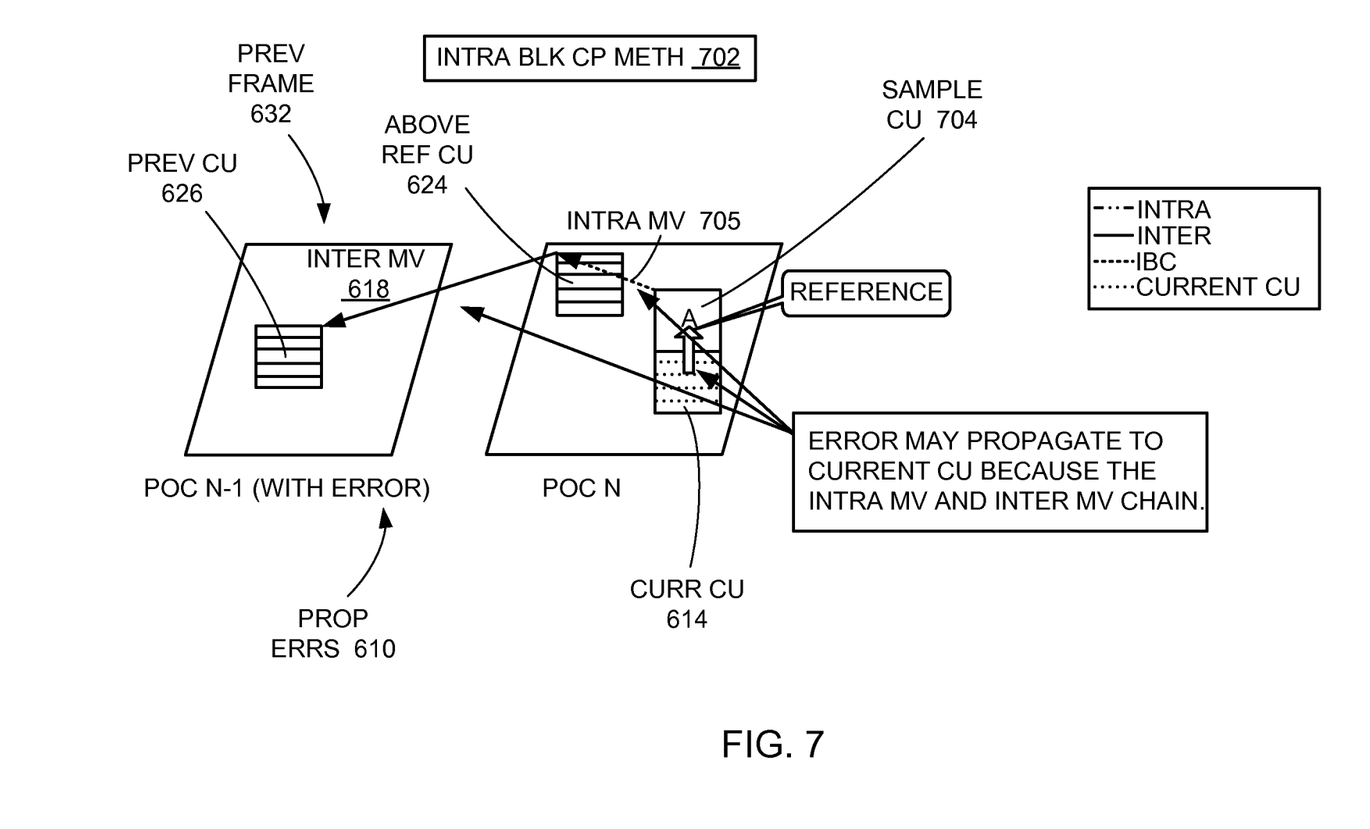
FIG. 7 is an example diagram of an intra block copying method of the video coding system of FIG. 1.

Referring now to FIG. 7, therein is shown an example diagram of an intra block copying method 702 of the video coding system 100 of FIG. 1. FIG. 7 depicts the propagation errors 610 of FIG. 6 if the current coding unit 614 is coded using or references a sample coding unit 704, which is in turn coded using or references the above reference coding unit 624 using an intra motion vector 705.

The current coding unit 614 is coded using the intra-picture prediction mode 602 of FIG. 6 when the intra block copying method 702 is employed. The intra block copying method 702 is a method that copies a preceding block region of a picture with specific constraints, which will be subsequently described. The intra block copying method 702 employs the intra block copying (IBC) mode that was previously mentioned.

The above reference coding unit 624 can be coded or references the previous coding unit 626 in the previous frame 632 using the inter motion vector 618. For illustrative purposes, the previous coding unit 626 is shown as coded using the inter-picture prediction mode 612 of FIG. 6, although it is understood that the previous coding unit 626 can be coded using any coding modes or methods. For example, the previous coding unit 626 can be coded using the intra-picture prediction mode 602.

The intra block copying method 702 can be implemented based on the constrained intra prediction flag 604 of FIG. 6. The purpose of the constrained intra prediction flag 604 is to prevent the propagation errors 610 in case temporal references including those that are used by the inter-picture prediction mode 612 are lost. For example, the constrained intra prediction flag 604 can represent the constrained_intra_pred_flag in HEVC version 1.

For example, in the extension works, the intra block copying process can be adopted. The intra block copying process can be treated as Mode Intra. The intra block copying process may have problems when interacting with the constrained intra prediction flag 604 due to the propagation errors 610 as shown in FIG. 7.

The propagation errors 610 can include errors propagating to the current coding unit 614 because of errors in a chain associated with the intra motion vector 705, the inter motion vector 618, or a combination thereof. As such, the intra block copying process adopted in the extension works is modified in the embodiments of the present invention to prevent the propagation errors 610.

The embodiments of the present invention prevent the current coding unit 614 from referencing the above reference coding unit 624, through the sample coding unit 704, when the constrained intra prediction flag 604 is true and the sample coding unit 704 is in an intra block copying mode by employing the intra block copying method 702. This prevents the propagation errors 610.

The intra motion vector 705 is information indicating a displacement between a location of a current block and that of a target block in an already decoded region within the same picture. The intra motion vector 705, or so-called the target block, serves as prediction for the current block. The intra motion vector 705 can be the motion vector using the intra-picture prediction mode 602 previously described in FIG. 6.

Figure 8:
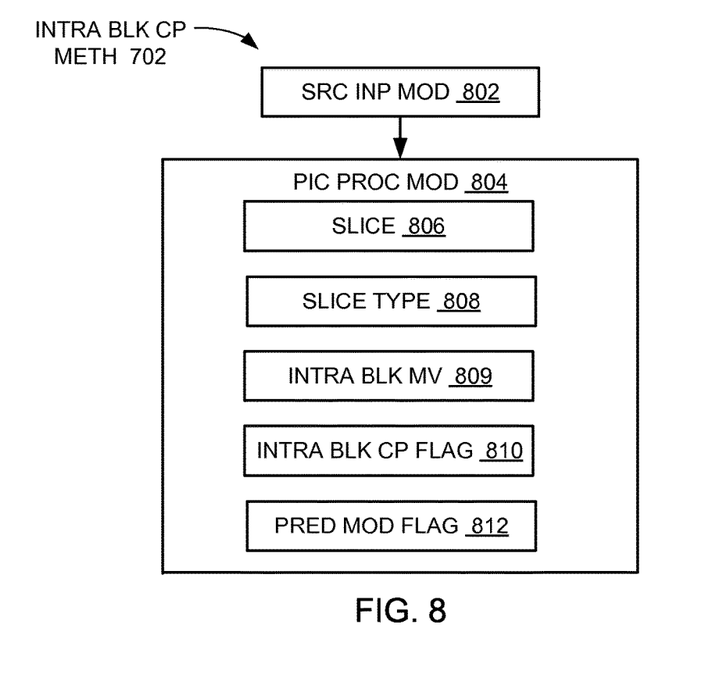
FIG. 8 is a flow diagram of the intra block copying method.

Referring now to FIG. 8, therein is shown a flow diagram of the intra block copying method 702. The intra block copying method 702 can be implemented with modules including the intra-picture prediction module 516 of FIG. 5 and the video decoder 104 of FIG. 1. The intra block copying method 702 is proposed in the video coding system 100 of FIG. 1 to change the interaction of the intra-picture prediction mode 602 of FIG. 6 and the constrained intra prediction flag 604.

The video coding system 100 can include a source input module 802 for receiving the frames 109 of FIG. 1 from the video source 108 of FIG. 1. The video coding system 100 can include the video stream 112 of FIG. 1 and the video bitstream 110 of FIG. 1, which can then be processed by other modules in the video encoder 102 of FIG. 1 and the video decoder 104, respectively.

The video coding system 100 can include a picture process module 804 for processing a picture or one of the frames 109 at a time. The picture process module 804 processes the picture by encoding video data or decoding coded data of the picture or the frames 109 using the intra block copying method 702. The picture process module 804 can be coupled to the source input module 802.

In the extension works, the intra motion compensation or the intra block coping (IBC) method can be used as an additional intra coding mode. However, the intra block copying process used in the extension works causes the propagation errors 610 of FIG. 6 as previously described in FIG. 7.

The constrained intra prediction flag 604 restricts the references to non-intra coded coding units (CU) for the purpose of error resilience. Because of the intra block copying (IBC) mode or the intra block copying process, the references to the CU with the intra block copying (IBC) mode is allowed. However, the IBC mode in the extension works can break the original intent for the error resilience of the constrained intra prediction flag 604.

For example, in a slice 806 with a slice type 808, the current coding unit 614 can have a neighboring coding unit (CU) or the sample coding unit 704, denoted as "A" in FIG. 7. The slice 806 is a sequence of a number of the coding tree unit 302 of FIG. 3 processed in an order of a raster scan. In this example, the neighboring coding unit (CU) or the sample coding unit 704 can be constructed or reconstructed using the intra block copying (IBC) mode and can refer to an inter mode CU or the above reference coding unit 624 in a search range of the sample coding unit 704.

The slice type 808 is a type of coding used in video data compression. The slice type 808 can include an I type, which is a coding type of a slice, in which all CUs of the slice 806 are coded using only an intra-picture prediction.

The slice type 808 can include a P type, which is a coding type of a slice, in which, in addition to the coding type of the slice 806 with the I type, a number of CUs of a P slice can also be coded using an inter-picture prediction with at most one motion-compensated prediction signal per prediction block (PB) or a uni-prediction. The slice type 808 can include a B type, which is a coding type of a slice, in which in addition to the coding type available in the slice 806 with the P type, a number of CUs of the slice 806 with the B type can also be coded using the inter-picture prediction with at most two motion compensated prediction signals per PB or a bi-prediction.

Thus, a reference chain is established from the current coding unit 614 to the sample coding unit 704, and the sample coding unit 704 to its reference including the above reference coding unit 624. Due to the reference chain, errors can propagate from a lost temporal picture or the previous coding unit 626 in the previous frame 632 of FIG. 6 to the sample coding unit 704 and eventually to the current coding unit 614.

The intra block copying method 702 of the video coding system 100 provides solutions for restricting the intra reference samples, which can include the left reference coding unit 622, such that the error resilience is maintained as the original intent of the constrained intra prediction flag 604. The error resilience improved by the video coding system 100 having the intra block copying method 702 can be applied in the extension works. The extension works address the inter-picture prediction mode 612 of FIG. 6 but misses or does not address the chain of the propagation errors 610 due to a packet loss scenario in the intra block copying (IBC) mode.

The intra block copying method 702 of the video coding system 100 is proposed to align with the original intent of the constrained intra prediction flag 604 as solutions for the slice 806 or the coding tree unit 302 with the slice type 808 including P type or B type. For the video encoder 102, the solutions can include an intra block motion vector 809 pointed to the left reference coding unit 622 and not pointed to reference pixels including the above reference coding unit 624 by the intra block copying method 702 and the above reference coding unit 624 derived from the previous coding unit 626 with the inter motion vector 618 of FIG. 6 using the inter-picture prediction mode 612.

The intra block motion vector 809 is information indicating transformation of a group of picture elements using the intra-picture prediction mode 602. The transformation is performed with the specific constraints using the constrained intra prediction flag 604 to prevent the propagation errors 610.

Also for the video encoder 102, the solutions can include the intra block motion vector 809 not pointed to the reference pixels including the sample coding unit 704 by the intra block copying method 702 and the sample coding unit 704 derived from the above reference coding unit 624 with the intra motion vector 705 of FIG. 6 using the intra-picture prediction mode 602 of FIG. 6. In this case, the above reference coding unit 624 can be derived from the previous coding unit 626 with the inter motion vector 618 using the inter-picture prediction mode 612.

For the video decoder 104, the solutions can include the reference pixels including the above reference coding unit 624 unavailable for pointing the current coding unit 614 thereto if the above reference coding unit 624 is derived from the previous coding unit 626 with the inter motion vector 618 using the inter-picture prediction mode 612. Also for the video decoder 104, the solutions can include the reference pixels including the sample coding unit 704 unavailable for pointing the current coding unit 614 thereto if the sample coding unit 704 is derived from the above reference coding unit 624 by the intra block copying method 702 with the intra motion vector 705 using the intra-picture prediction mode 602. In this case, the above reference coding unit 624 can be derived from the previous coding unit 626 with the inter motion vector 618 using the inter-picture prediction mode 612.

The intra block copying method 702 in the video decoder 104 can be implemented based on a general intra sample prediction. For example, the general intra sample prediction can be implemented based on a draft of HEVC in a document "JCTVC-N1005_v3.doc".

Inputs to a process of the general intra sample prediction can include a sample location, denoted as (xTbCmp, yTbCmp), specifying a top-left sample of a current transform block relative to a top left sample of a current picture. The inputs can include a variable for the intra-picture prediction mode 602, denoted as predModeIntra. The inputs can include a variable for a transform block size, denoted as nTbS. The inputs can include a colour component of the current coding unit 614, denoted as cIdx. Output of this process can include predicted samples, denoted as predSamples[x][y], with x, y={0, . . . , nTbS−1}.

Neighbouring samples p[x][y] of nTbS*4+1 that are constructed samples prior to a deblocking filter process, with x=−1, y=−1 . . . nTbS*2−1 and x=0 . . . nTbS*2−1, y=−1, can be derived as follows. A neighbouring location, denoted as (xNbCmp, yNbCmp), can be specified by Equation 1.

$$(xNbCmp, yNbCmp)=(xTbCmp+x, yTbCmp+y) \quad (Eq. 1)$$

A current luma location, denoted as (xTbY, yTbY), and a neighbouring luma location, denoted as (xNbY, yNbY), can be derived by Equation 2 and Equation 3, respectively, as follows:

$$(xTbY, yTbY)=(cIdx==0)?(xTbCmp, yTbCmp): \\ (xTbCmp*SubWidthC, yTbCmp*SubHeightC) \quad (Eq. 2)$$

$$(xNbY, yNbY)=(cIdx==0)?(xNbCmp, yNbCmp): \\ (xNbCmp*SubWidthC, yNbCmp*SubHeightC) \quad (Eq. 3)$$

An availability derivation process for a block in a z-scan order can be invoked with the current luma location, denoted as (xCurr, yCurr), set equal to (xTbY, yTbY) and the neighbouring luma location (xNbY, yNbY) as inputs, and an output can be assigned to availableN. For example, the availability derivation process can be specified in subclause 6.4.1 of "JCTVC-N1005_v3.doc".

Each sample p[x][y] can be derived as follows. If one or more of the following conditions are true, the sample p[x][y] can be marked as "not available for intra prediction". The conditions can include the variable availableN is equal to FALSE. The conditions can include a current unit prediction mode, denoted as CuPredMode[xNbY][yNbY], is not equal to MODE_INTRA and constrained_intra_pred_flag is equal to 1.

In addition to the general intra sample prediction described above, the intra block copying method 702 in the video decoder 104 can be implemented with additional changes proposed for the video coding system 100 as subsequently described below. The intra block copying method 702 can be implemented based on the slice type 808, an intra block copying flag 810, and the constrained intra prediction flag 604.

If one or more of the following conditions are true, the sample p[x][y] is marked as "not available for intra prediction". The sample can include the above reference coding unit 624 and the sample coding unit 704.

The intra block copying flag 810, denoted as intra_bc_flag[x0][y0], is an identifier that indicates the current coding unit 614 is coded with the intra block copying method 702. The intra block copying flag 810 equal to 1 indicates that the current coding unit 614 is coded with the intra block copying method 702.

The intra block copying flag 810 equal to 0 indicates that the current coding unit 614 is coded according to a prediction mode flag 812, denoted as pred mode flag. When not present, a value of the intra block copying flag 810 can be default to be equal to 0. The array indices x0 and y0 can indicate a location (x0, y0) of a top-left luma sample of a considered coding block relative to a top-left luma sample of a picture.

The prediction mode flag 812 equal to 0 indicates that the current coding unit 614 is coded in the inter-picture prediction mode 612. The prediction mode flag 812 equal to 1 indicates that the current coding unit 614 is coded in the intra-picture prediction mode 602.

One of the conditions includes the slice type 808 is equal to the P type and the intra block copying flag 810, denoted as intra bc flag[xNbY][yNbY], is equal to 1, and the constrained intra prediction flag 604 is equal to 1. Another of the conditions includes the slice type 808 is equal to the B type and the intra block copying flag 810, denoted as intra_bc_flag[xNbY][yNbY], is equal to 1, and the constrained intra prediction flag 604 is equal to 1. Otherwise, the sample p[x][y] can be marked as "available for intra prediction" and the sample at the location (xNbCmp, yNbCmp) can be assigned to p[x][y].

The picture process module 804 can generate the left reference coding unit 622, the above reference coding unit 624, and the sample coding unit 704, which are located with respect to the current coding unit 614. The left reference coding unit 622, the above reference coding unit 624, or the sample coding unit 704 can be located to the left of, above, or to the right of the current coding unit 614.

The picture process module 804 can generate the intra block motion vector 809 based on the interaction of the intra-picture prediction mode 602 and the constrained intra prediction flag 604 by employing the intra block copying method 702. The interaction of the intra-picture prediction mode 602 and the constrained intra prediction flag 604 refers to a process of the intra block copying method 702, whereby the intra block motion vector 809 points to the left reference coding unit 622, which is not generated or constructed directly or indirectly using the inter-picture prediction mode 612.

The term "indirectly" refers to the left reference coding unit 622 not pointing to a reference coding unit that is generated or constructed using the inter-picture prediction mode 612, where the reference coding unit can be in the same frame or coding picture as the left reference coding unit 622. For example, the left reference coding unit 622 is different from the above reference coding unit 624 because the left reference coding unit 622 is not generated or constructed directly using the inter-picture prediction mode 612 like the above reference coding unit 624. Also for example, the left reference coding unit 622 is different from the sample coding unit 704 because the left reference coding unit 622 is not generated or constructed indirectly using the inter-picture prediction mode 612 like the sample coding unit 704.

For illustrative purposes, the left reference coding unit 622 has been described as being to the left of the current coding unit 614, although it is understood that the left reference coding unit 622 can be a specific reference coding unit. The specific reference coding unit can be at any location relative to a location of the current coding unit 614 as long as the specific reference coding unit is not generated or constructed directly or indirectly using the inter-picture prediction mode 612.

The picture process module 804 can generate the current coding unit 614 based on the intra block motion vector 809 to subsequently generate the video bitstream 110. The video bitstream 110 can be sent to the video decoder 104 to receive, decode, and display on a device, such as the display interface 120.

The physical transformation from the images of physical objects of the video source 108 to displaying the video stream 112 on pixel elements of the display interface 120 results in physical changes to the pixel elements of the display interface 120 in the physical world, such as changes of electrical states of the pixel elements, based on the operation of the video coding system 100. As the changes in the physical world occur, such as the motion of the objects captured in the video source 108, the movement itself creates additional information, such as updates to the video source 108, which are converted back into changes in the pixel elements of the display interface 120 for continued operation of the video coding system 100.

It has been found that the intra block motion vector 809 improves prediction quality of the current coding unit 614. The prediction quality is improved when the intra block motion vector 809 is generated with the constrained intra prediction flag 604 enabled, and pointed to the left reference coding unit 622 generated based on only the intra-picture prediction mode 602 and not pointed to the above reference coding unit 624, thereby preventing the propagation errors 610. The prediction quality is also improved when the intra block motion vector 809 is not pointed to the sample coding unit 704 by the intra block copying method 702 and the sample coding unit 704 having the propagation errors 610 is derived from the above reference coding unit 624.

It has also been found that the intra block motion vector 809 improves compensation quality of the current coding unit 614. The compensation quality is improved when the above reference coding unit 624 is unavailable for pointing the current coding unit 614 thereto if the above reference coding unit 624 is derived from the previous coding unit 626, resulting in prevention of the propagation errors 610. The compensation quality is also improved when the sample coding unit 704 is unavailable for pointing the current coding unit 614 thereto if the sample coding unit 704 is derived from the above reference coding unit 624 by the intra block copying method 702.

It has further been found that the intra block copying method 702 implemented based on the slice type 808, the intra block copying flag 810, and the constrained intra prediction flag 604 also improves the compensation quality of the current coding unit 614. The compensation quality is improved when the slice type 808, the intra block copying flag 810, and the constrained intra prediction flag 604 are employed to determine the conditions as previously described to mark the reference samples, including the above reference coding unit 624 and the sample coding unit 704, as "not available for intra prediction" to prevent the propagation errors 610.

Figure 9:
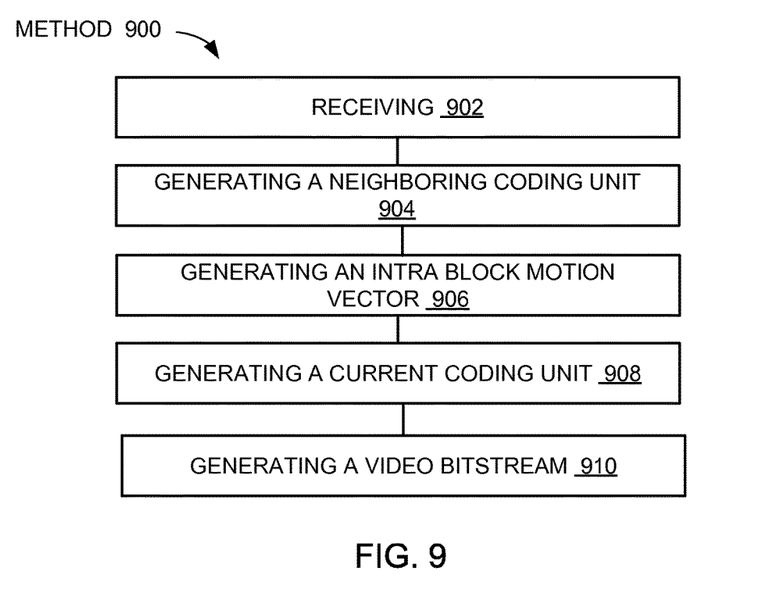
FIG. 9 is a flow chart of a method of operation of a video coding system in a further embodiment of the present invention.

Referring now to FIG. 9, therein is shown a flow chart of a method 900 of operation of a video coding system in a further embodiment of the present invention. The method 900 includes: receiving a frame from a video source in a block 902; generating a neighboring coding unit in the frame in a block 904; generating an intra block motion vector with a constrained intra prediction flag enabled and the neighboring coding unit generated based on only an intra-picture prediction mode in a block 906; generating a current coding unit based on the intra block motion vector, the current coding unit adjacent the neighboring coding unit in a block 908; and generating a video bitstream based on the current coding unit for a video decoder to receive and decode for displaying on a device in a block 910.

Thus, it has been discovered that the video coding system 100 of FIG. 1 of the present invention furnishes important and heretofore unknown and unavailable solutions, capabilities, and functional aspects for a video coding system with intra prediction mechanism. The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a video coding system, comprising:
   generating an intra block motion vector from a first neighboring coding unit, based on a constrained intra prediction flag that is enabled in a first frame,
      wherein the first neighboring coding unit is different from a sample coding unit in the first frame,
      wherein the sample coding unit is derived with an intra motion vector using an intra-picture prediction mode, and
      wherein the intra motion vector corresponds to a displacement between a first location of the first neighboring coding unit and a second location of the sample coding unit;
   generating a current coding unit based on the generated intra block motion vector,
      wherein the current coding unit is adjacent to the first neighboring coding unit; and
   generating a video bitstream based on the generated current coding unit.

2. The method as claimed in claim 1,
   wherein the first neighboring coding unit is further different from a second neighboring coding unit in the first frame,
   wherein the second neighboring coding unit is derived from a previous coding unit that corresponds to a second frame, and
   wherein the second frame is generated before the first frame.

3. The method as claimed in claim 1,
   wherein the first neighboring coding unit is further different from a sample coding unit in the first frame,
   wherein the sample coding unit is derived from a second neighboring coding unit in the first frame.

4. The method as claimed in claim 1, further comprising generating a second neighboring coding unit in the first frame,
   wherein the second neighboring coding unit is unavailable for pointing the current coding unit based on determination that the second neighboring coding unit is derived from a previous coding unit in a previous frame, and
   wherein the previous frame is generated before the first frame.

5. A method of operation of a video coding system, comprising:
   generating an intra block motion vector from a first neighboring coding unit, based on a constrained intra prediction flag that is enabled in a first frame,
      wherein the generated intra block motion vector points to the first neighboring coding unit that is different from a sample coding unit in the first frame that includes a propagation error,
      wherein the sample coding unit is derived with an intra motion vector using an intra-picture prediction mode, and
      wherein the intra motion vector corresponds to a displacement between a first location of the first neighboring coding unit and a second location of the sample coding unit;
   generating a current coding unit based on the generated intra block motion vector,
      wherein the current coding unit is adjacent to the first neighboring coding unit; and
   generating a video bitstream based on the generated current coding unit.

6. The method as claimed in claim 5,
   wherein the first neighboring coding unit is further different from a second neighboring coding unit in the first frame, and
   wherein the second neighboring coding unit is derived from a previous coding unit in a previous frame generated before the first frame.

7. The method as claimed in claim 5,
   wherein the sample coding unit is derived from a second neighboring coding unit in the first frame with the intra motion vector using the intra-picture prediction mode,
   wherein the second neighboring coding unit is derived from a previous coding unit in a previous frame generated before the first frame, based on an inter-picture prediction mode, and
   wherein the second neighboring coding unit is with an inter motion vector.

8. The method as claimed in claim 5, further comprising generating a second neighboring coding unit in the first frame,
   wherein the second neighboring coding unit is unavailable for pointing the current coding unit, based on determination that the second neighboring coding unit is derived from a previous coding unit in a previous frame, and
   wherein the previous frame is generated before the first frame with an inter motion vector using an inter-picture prediction mode.

9. A video coding system, comprising:
   circuitry configured to:
      generate an intra block motion vector from a first neighboring coding unit, based on a constrained intra prediction flag that is enabled in a first frame,
         wherein the first neighboring coding unit is different from a sample coding unit in the first frame,
         wherein the sample coding unit is derived with an intra motion vector using an intra-picture prediction mode, and
         wherein the intra motion vector corresponds to a displacement between a first location of the first neighboring coding unit and a second location of the sample coding unit;
      generate a current coding unit based on the generated intra block motion vector,
         wherein the current coding unit is adjacent to the first neighboring coding unit; and
      generate a video bitstream based on the generated current coding unit for a video decoder,
      wherein the video decoder is configured to receive the video bitstream and decode the video bitstream to display on a device.

10. The system as claimed in claim 9,
    wherein the circuitry is further configured to generate the intra block motion vector that points to the first neighboring coding unit that is further different from a second neighboring coding unit in the first frame, and
    wherein the second neighboring coding unit is derived from a previous coding unit that corresponds to a second frame; and
    wherein the second frame is generated before the first frame.

11. The system as claimed in claim 9,
    wherein the sample coding unit is derived from a second neighboring coding unit in the first frame.

12. The system as claimed in claim 9,
wherein the circuitry is further configured to generate a second neighboring coding unit in the first frame,
wherein the second neighboring coding unit is unavailable to point the current coding unit based on determination that the second neighboring coding unit is derived from a previous coding unit in a previous frame, and
wherein the previous frame is generated before the first frame.

13. The system as claimed in claim 9,
wherein the sample coding unit includes a propagation error.

14. The system as claimed in claim 13,
wherein the circuitry is further configured to generate the intra block motion vector that points to the first neighboring coding unit that is further different from a second neighboring coding unit in the first frame, and
wherein the second neighboring coding unit is derived from a previous coding unit in a previous frame generated before the first frame.

15. The system as claimed in claim 13,
wherein the sample coding unit is derived from a second neighboring coding unit in the first frame with the intra motion vector using the intra-picture prediction mode.

16. The system as claimed in claim 15,
wherein the sample coding unit is derived from a second neighboring coding unit in the first frame with the intra motion vector based on the intra-picture prediction mode,
wherein the second neighboring coding unit is derived from a previous coding unit in a previous frame generated before the first frame, based on an inter-picture prediction mode, and
wherein the second neighboring coding unit is with an inter motion vector.

17. The system as claimed in claim 13,
wherein the circuitry is further configured to generate a second neighboring coding unit in the first frame,
wherein the second neighboring coding unit is unavailable for pointing the current coding unit based on determination that the second neighboring coding unit is derived from a previous coding unit in a previous frame, and
wherein the previous frame is generated before the first frame with an inter motion vector using an inter-picture prediction mode.

* * * * *